US011795766B2

(12) United States Patent
McKenzie et al.

(10) Patent No.: US 11,795,766 B2
(45) Date of Patent: Oct. 24, 2023

(54) LUBRICATOR ASSEMBLY AND METHOD FOR SERVICING TUBULAR MEMBERS

(71) Applicant: National Oilwell Varco, L.P., Houston, TX (US)

(72) Inventors: Andrew McKenzie, Cypress, TX (US); Robert Donnally, Plano, TX (US); Lei Cheng, Shanghai (CN); George Wu, Shanghai (CN); Leo Yang, Shanghai (CN)

(73) Assignee: National Oilwell Varco, L.P., Houston, TX (US)

( * ) Notice: Subject to any disclaimer, the term of this patent is extended or adjusted under 35 U.S.C. 154(b) by 400 days.

(21) Appl. No.: 17/285,713

(22) PCT Filed: Oct. 15, 2019

(86) PCT No.: PCT/US2019/056279
§ 371 (c)(1),
(2) Date: Apr. 15, 2021

(87) PCT Pub. No.: WO2020/081535
PCT Pub. Date: Apr. 23, 2020

(65) Prior Publication Data
US 2022/0003048 A1 Jan. 6, 2022

Related U.S. Application Data

(60) Provisional application No. 62/745,817, filed on Oct. 15, 2018.

(51) Int. Cl.
*E21B 17/00* (2006.01)
*E21B 33/068* (2006.01)
*F16C 1/24* (2006.01)

(52) U.S. Cl.
CPC .......... *E21B 17/006* (2013.01); *E21B 33/068* (2013.01); *F16C 1/24* (2013.01)

(58) Field of Classification Search
CPC ...... E21B 33/038; E21B 17/006; E21B 19/16; E21B 33/076; F16C 1/24
(Continued)

(56) References Cited

U.S. PATENT DOCUMENTS 3,517,738 A * 6/1970 Petersen ............... E21B 33/076
166/349
4,286,665 A * 9/1981 Walker .................... E21B 41/08
175/7
(Continued)

FOREIGN PATENT DOCUMENTS

WO 2016140614 A1 9/2016

OTHER PUBLICATIONS

International Search Report and Written Opinion dated Jan. 13, 2020, for Application No. PCT/US2019/056279.

*Primary Examiner* — Henry Y Liu
(74) *Attorney, Agent, or Firm* — Conley Rose, P.C.

(57) ABSTRACT

A lubricator assembly for servicing a tubular member includes a mounting base, a lubricant housing movably coupled to the mounting base and configured to receive lubricant from a lubricant source, a guide pin slidably disposed in the lubricant housing, a first seal positioned between the guide pin and the lubricant housing and a second seal positioned between the guide pin and the lubricant housing, and a first chamber extending between the first seal and the second seal, wherein the guide pin is configured to direct lubricant disposed in the first chamber against the tubular member in response to the tubular member engaging the guide pin.

27 Claims, 13 Drawing Sheets

(58) Field of Classification Search
USPC .................................................. 184/14, 18
See application file for complete search history.

(56) References Cited

U.S. PATENT DOCUMENTS

| | | | | |
|---|---|---|---|---|
| 4,823,878 A * | 4/1989 | Brammer | ............... | F16L 37/002 |
| | | | | 166/359 |
| 4,823,879 A * | 4/1989 | Brammer | ............ | E21B 41/0014 |
| | | | | 166/359 |
| 4,893,677 A * | 1/1990 | Brammer | ............ | E21B 33/038 |
| | | | | 166/359 |
| 4,997,384 A * | 3/1991 | Godfrey | ................ | E21B 23/006 |
| | | | | 166/66.4 |
| 6,173,782 B1 * | 1/2001 | Watkins | ................ | E21B 19/004 |
| | | | | 405/224.2 |
| 6,408,949 B1 * | 6/2002 | Aquilera | ............... | E21B 33/035 |
| | | | | 166/341 |
| 7,874,372 B2 * | 1/2011 | Varkey | .................... | E21B 19/22 |
| | | | | 166/384 |
| 8,047,295 B2 * | 11/2011 | Skeels | ................... | E21B 33/076 |
| | | | | 166/348 |
| 9,222,313 B2 * | 12/2015 | Vatne | ...................... | E21B 17/01 |
| 2010/0230115 A1 * | 9/2010 | Belik | ..................... | E21B 19/089 |
| | | | | 166/380 |
| 2013/0020091 A1 * | 1/2013 | Maerz | ................... | E21B 43/121 |
| | | | | 166/90.1 |
| 2013/0098632 A1 * | 4/2013 | Wetzel | ................. | E21B 43/128 |
| | | | | 166/85.1 |
| 2014/0110173 A1 * | 4/2014 | Belik | ..................... | B05D 7/222 |
| | | | | 175/57 |
| 2015/0136422 A1 * | 5/2015 | Rodgers | ................ | E21B 19/22 |
| | | | | 166/379 |
| 2016/0047180 A1 * | 2/2016 | Belik | ...................... | E21B 47/12 |
| | | | | 166/77.52 |

* cited by examiner ically LUBRICATOR ASSEMBLY AND METHOD
FOR SERVICING TUBULAR MEMBERS

CROSS-REFERENCE TO RELATED
APPLICATIONS

The present application is a 35 U.S.C. § 371 national stage application of PCT/US2019/056279 filed Oct. 15, 2019, and entitled "Lubricator Assembly and Method for Servicing Tubular Members" which claims benefit of U.S. provisional patent application No. 62/745,817 filed Oct. 15, 2018, entitled "Lubricator Assembly and Method for Servicing Tubular Members," both of which are incorporated herein by reference in their entirety for all purposes.

STATEMENT REGARDING FEDERALLY
SPONSORED RESEARCH OR DEVELOPMENT

Not applicable.

BACKGROUND

Operations in an oil or gas well are normally carried out using tool strings made of "pipes" and other tools. The term "pipe" encompasses any tubular good that can be included in a tool string for the purpose of carrying out an operation in a well. A drill string is an example of a tool string used for drilling a well and is made up of drill pipes and other drilling-related tools. For a drilling operation, a rotary table or power drive, arranged above the well, engages the top of the drill string and rotates the drill string to drill the borehole. Periodically, drill pipes are added to the drill string, e.g., in order to make the drill string of sufficient length to reach the desired depth of the well. Periodically, drill pipes are also removed from the drill string, e.g., in order to change the configuration of a tool, such as a drill bit, in the drill string. Drill pipes are typically added to or removed from the drill string in the form of "pipe stands." A pipe stand is made up of multiple connected pipes.

To add a new pipe stand to a pipe in a well, the new pipe stand is suspended over the pipe in the well by an elevator and then moved vertically towards the pipe in the well by draw-works. The lowermost end of the pipe stand includes a pin, and the uppermost end of the pipe in the well includes a box. To make a connection between the pipe stand and the pipe in the well, the pin has to be stabbed into the box. After the pin has been stabbed into the box, the pipe stand can be rotated to make up the connection. In some cases, prior to connecting a drill pipe to the drill string, the pin and box of the drill pipe are cleaned. In at least some applications, this cleaning is carried out while the drill pipe is in the vertical position. The cleaning of the drill pipe and lubrication of the box prior to making up the pipe connection lengthen the duration of the tripping in. Also, the vertical orientation of the drill pipe during the cleaning as well as time constraints on rig operations can make it difficult to achieve quality pipe cleaning and lubrication.

SUMMARY

An embodiment of a lubricator assembly for servicing a tubular member comprises a mounting base, a lubricant housing movably coupled to the mounting base and configured to receive lubricant from a lubricant source, a guide pin slidably disposed in the lubricant housing, a first seal positioned between the guide pin and the lubricant housing and a second seal positioned between the guide pin and the lubricant housing, and a first chamber extending between the first seal and the second seal, wherein the guide pin is configured to direct lubricant disposed in the first chamber against the tubular member in response to the tubular member engaging the guide pin. In some embodiments, the lubricator assembly further comprises a second chamber extending between the first seal and an end of the lubricant housing, wherein the second chamber is configured to receive an end of the tubular member. In some embodiments, the lubricator assembly further comprises a first port formed in the lubricant housing that is in fluid communication with the first chamber, and a second port formed in the lubricant housing that is in fluid communication with the second chamber. In certain embodiments, the lubricator assembly further comprises a first fluid conduit in fluid communication with the first port and the lubricant source, and a second fluid conduit in fluid communication with the first port and the second port. In certain embodiments, the first seal and the second seal each sealingly engage an outer surface of the guide pin. In some embodiments, an inner surface of the lubricant housing comprises a first stop configured to limit movement of the guide pin through the lubricant housing in a first axial direction and a second stop configured to limit movement of the guide pin through the lubricant housing in a second axial direction opposite the first axial direction. In some embodiments, the lubricator assembly further comprises a brush coupled to an end of the lubricator housing that is configured to clean an end of the tubular member. In certain embodiments, the lubricator assembly further comprises a biasing member coupled between the mounting base and the lubricant housing, wherein the biasing member permits angular misalignment between a central axis of the mounting base and a central axis of the lubricant housing. In certain embodiments, the lubricator assembly further comprises a spherical bearing positioned between the lubricant housing and the mounting base. In some embodiments, the spherical bearing comprises a first ring coupled to an end of the lubricant housing, wherein the first ring comprises a first hemispherical surface, and a second ring slidably disposed on the mounting base, wherein the second ring comprises a second hemispherical surface that matingly engages the first hemispherical surface. In some embodiments, the lubricant assembly further comprises a position sensor coupled to the lubricant housing, wherein the guide pin comprises a first position in the lubricant housing and a second position in the housing that is spaced from the first position, and wherein the guide pin is configured to actuate from the first position to the second position in response to the tubular member engaging the guide pin, wherein the position sensor is configured to detect the presence of the guide pin in the second position.

An embodiment of a lubricator assembly for servicing a tubular member comprises a mounting base mountable to a rig floor of a platform, a lubricant housing movably coupled to the mounting base and configured to receive lubricant from a lubricant source, a guide pin slidably disposed in the lubricant housing, wherein the guide pin is configured to direct lubricant against the tubular member in response to the tubular member engaging the guide pin, a first biasing member coupled between the mounting base and the lubricant housing, wherein the biasing member permits angular misalignment between a central axis of the mounting base and a central axis of the lubricant housing. In some embodiments, the mounting base comprises a base plate and a plurality of circumferentially spaced mounts, and the lubricator assembly comprises a plurality of the first biasing members, and wherein each first biasing member is received in one of the mounts of the mounting base. In some embodiments, the lubricator assembly further comprises a plurality of circumferentially spaced spring retainers coupled to the lubricant housing, wherein each of the first biasing members extends into one of the spring retainers, and a plurality of second biasing members, wherein each second biasing member extends between one of the spring retainers and a retainer nut coupled to the mounting base. In certain embodiments, each mount comprises a curved inner surface, an outer surface of the lubricant housing comprises an annular shoulder, and the degree of permitted angular misalignment between the central axis of the mounting base and the central axis of the lubricant housing is limited by interference between the shoulder of the lubricant housing and the curved inner surfaces of the mounts. In some embodiments, the lubricator assembly further comprises a first seal positioned between the guide pin and the lubricant housing and a second seal positioned between the guide pin and the lubricant housing, and a first chamber extending between the first seal and the second seal, wherein the guide pin is configured to direct lubricant disposed in the first chamber against the tubular member in response to the tubular member engaging the guide pin. In some embodiments, the lubricator assembly further comprises a second chamber extending between the first seal and an end of the lubricant housing, wherein the second chamber is configured to receive an end of the tubular member. In some embodiments, the lubricator assembly further comprises a first port formed in the lubricant housing that is in fluid communication with the first chamber, and a second port formed in the lubricant housing that is in fluid communication with the second chamber. In certain embodiments, the lubricator assembly further comprises a first fluid conduit in fluid communication with the first port and the lubricant source, and a second fluid conduit in fluid communication with the first port and the second port. In certain embodiments, the lubricator assembly further comprises a spherical bearing positioned between the lubricant housing and the mounting base. In some embodiments, the spherical bearing comprises a first ring coupled to an end of the lubricant housing, wherein the first ring comprises a first hemispherical surface, and a second ring slidably disposed on the mounting base, wherein the second ring comprises a second hemispherical surface that matingly engages the first hemispherical surface. In some embodiments, the lubricant assembly further comprises a position sensor coupled to the lubricant housing, wherein the guide pin comprises a first position in the lubricant housing and a second position in the housing that is spaced from the first position, and wherein the guide pin is configured to actuate from the first position to the second position in response to the tubular member engaging the guide pin, wherein the position sensor is configured to detect the presence of the guide pin in the second position.

An embodiment of a method for lubricating an end of a tubular member comprises (a) inserting an end of the tubular member into a lubricant housing of a lubricator assembly, (b) displacing a guide pin of the lubricator assembly through the lubricant housing in response to (a), and (c) directing lubricant against the end of the tubular member in response to (b). In some embodiments, the method further comprises (d) ejecting lubricant disposed in a first chamber formed between the guide pin and the lubricant housing of the lubricator assembly in response to inserting the end of the tubular member into the lubricant housing. In some embodiments, the method further comprises (e) injecting lubricant into a second chamber formed between the guide pin and the lubricant housing in response to (d). In certain embodiments, the method further comprises (d) angularly misaligning a central axis of a mounting base of the lubricator assembly with a central axis of the lubricant assembly in response to (a). In certain embodiments, (b) comprises (b1) actuating the guide pin from a first position in the lubricant housing to a second position in the lubricant housing which is spaced from the first position, and the method further comprises (d) detecting the presence of the guide pin in the second position using a position sensor.

BRIEF DESCRIPTION OF THE DRAWINGS

For a detailed description of exemplary embodiments, reference will now be made to the accompanying drawings in which.

DETAILED DESCRIPTION

Figure 1:
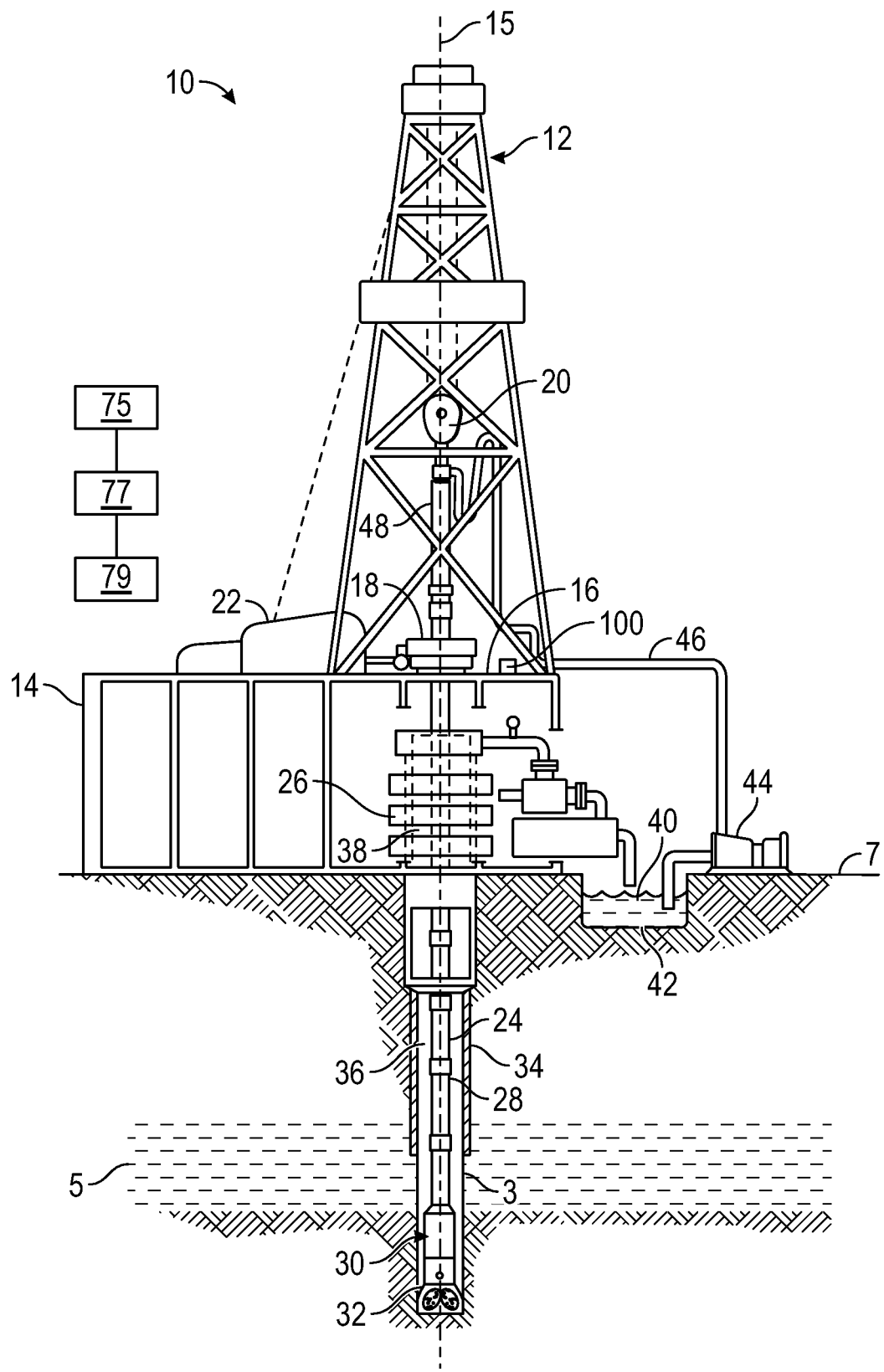
FIG. 1 is a schematic view of an embodiment of a well system in accordance with principles disclosed herein.
Figure 2:
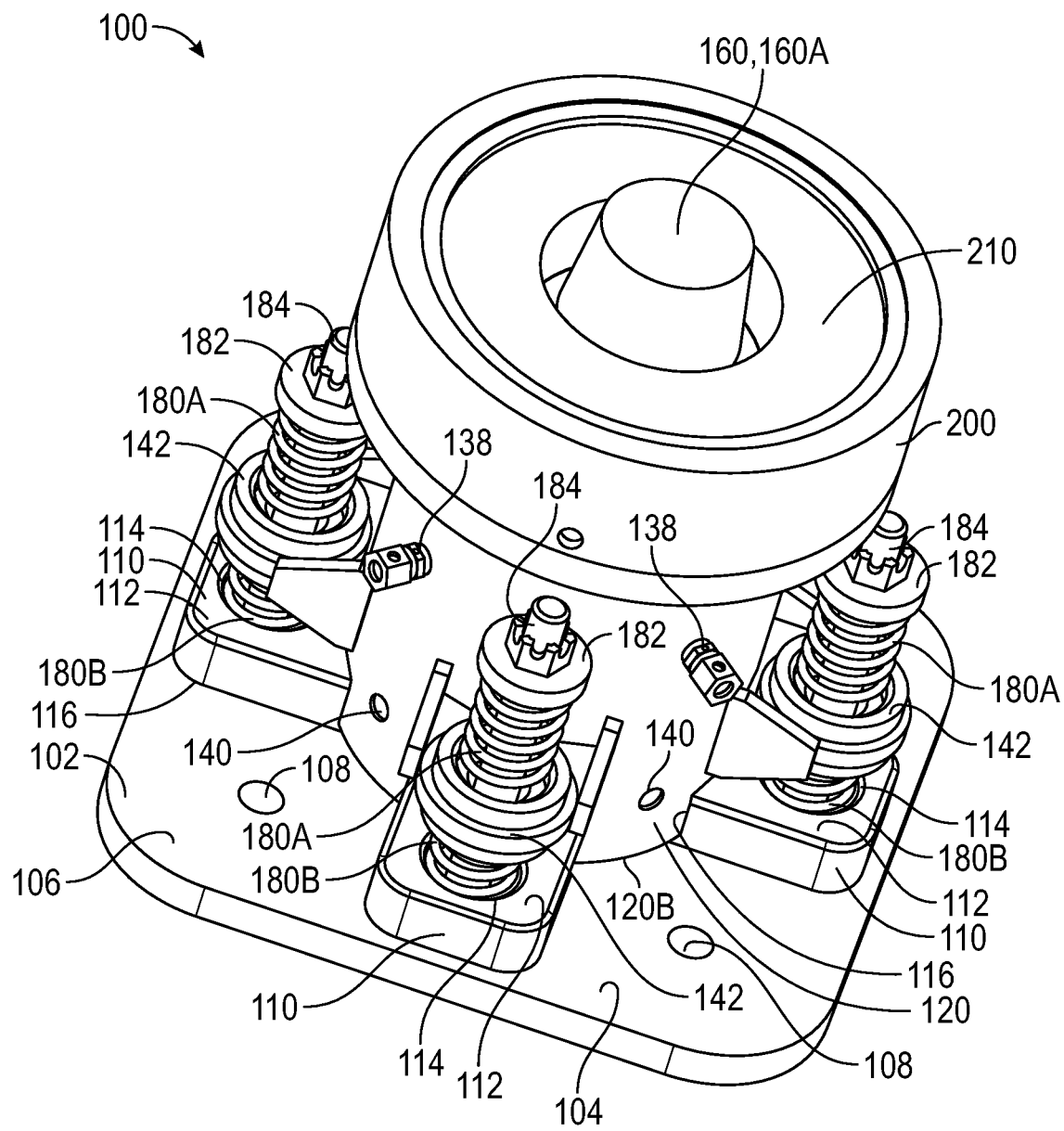
FIGS. 2, 3 are perspectives view of an embodiment of a lubricator assembly of the well system of FIG. 1 in accordance with principles disclosed herein.
Figure 3:
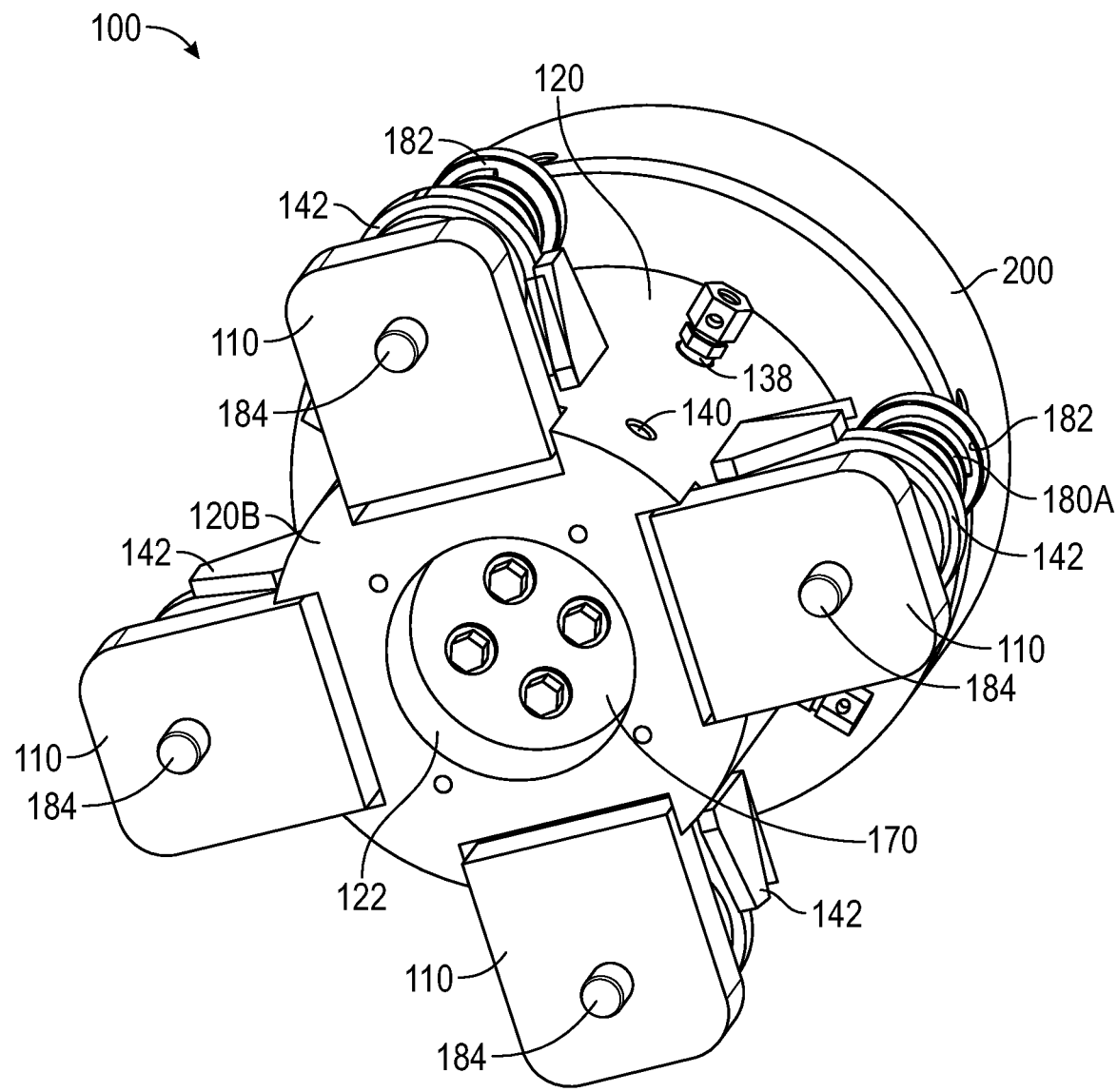
Figure 4:
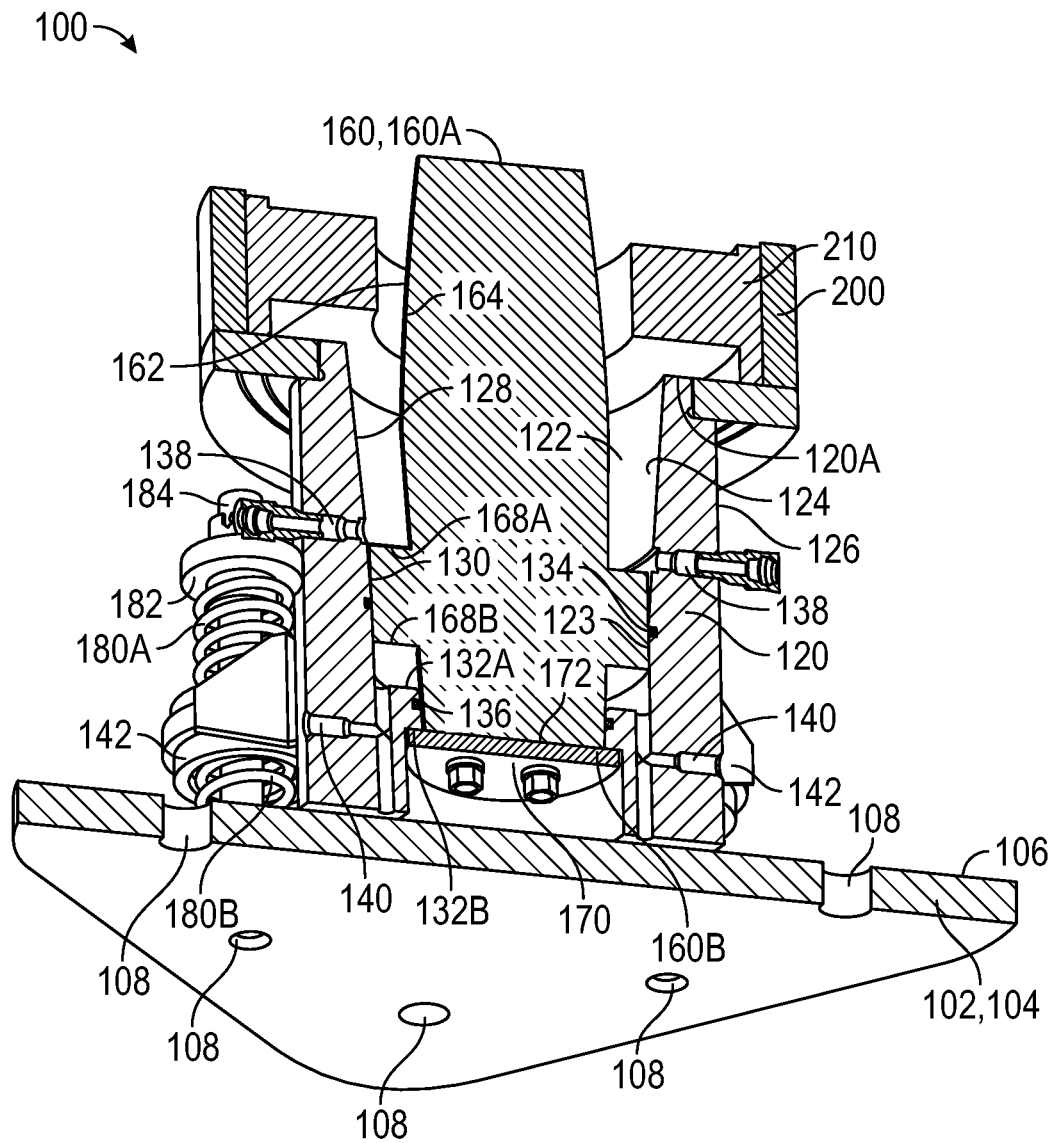
FIG. 4 is a perspective, cross-sectional view of the lubricator assembly of FIGS. 2, 3.
Figure 5:
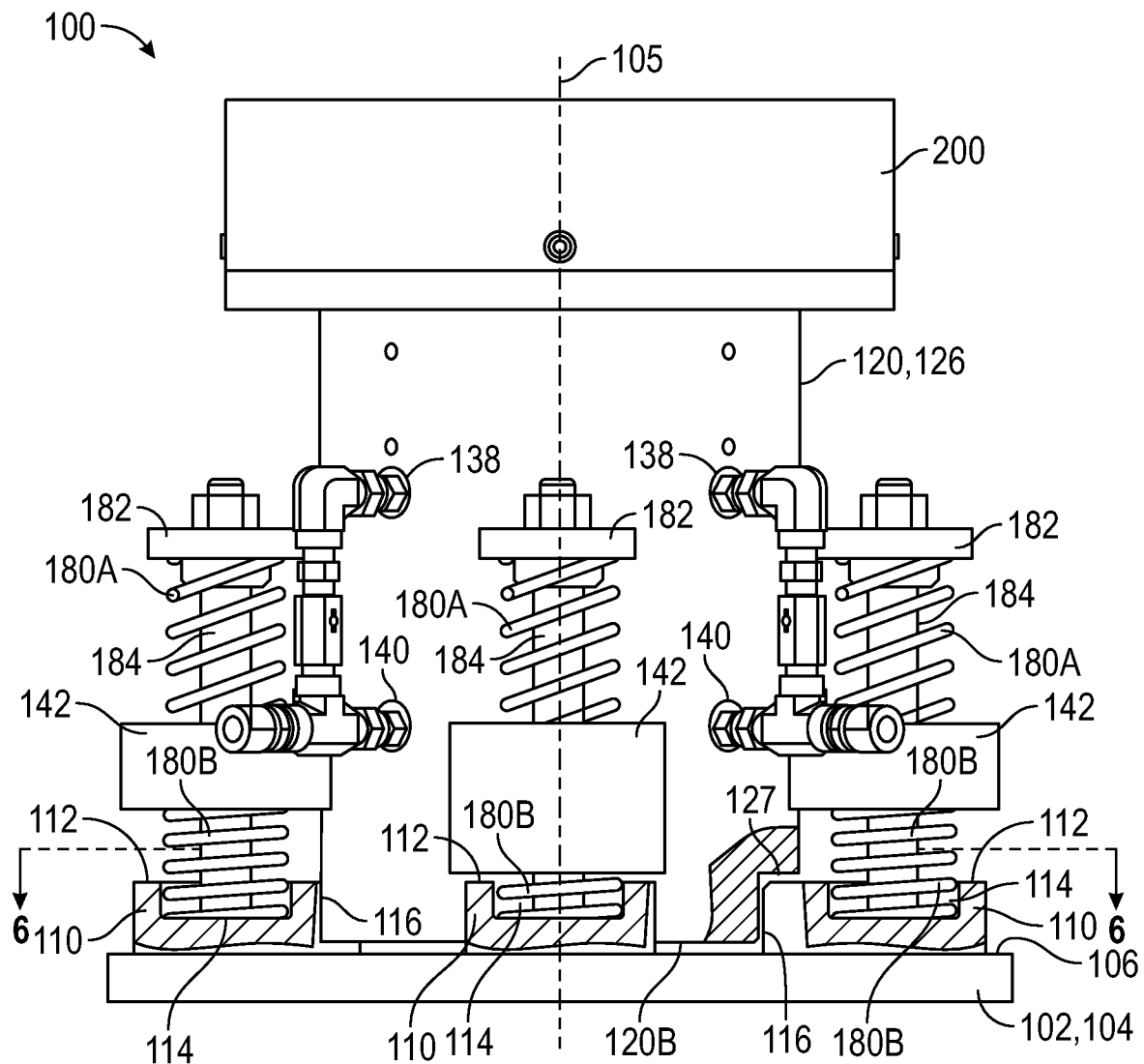
FIG. 5 is a side view of the lubricator assembly of FIGS. 2, 3.
Figure 6:
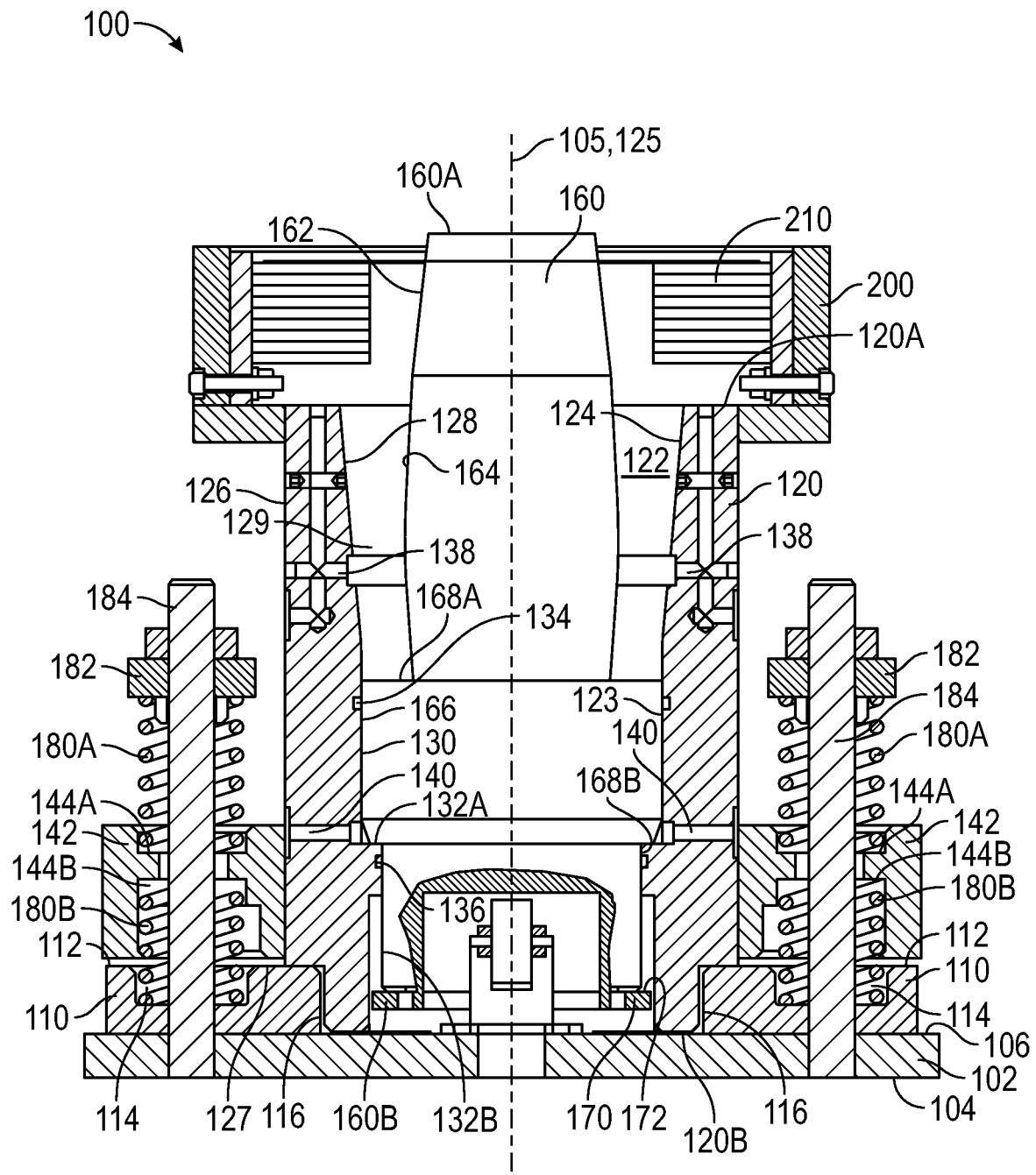
FIGS. 6, 7 are cross-sectional views along lines 6-6 of FIG. 5 of the lubricator assembly of FIGS. 2, 3.
Figure 7:
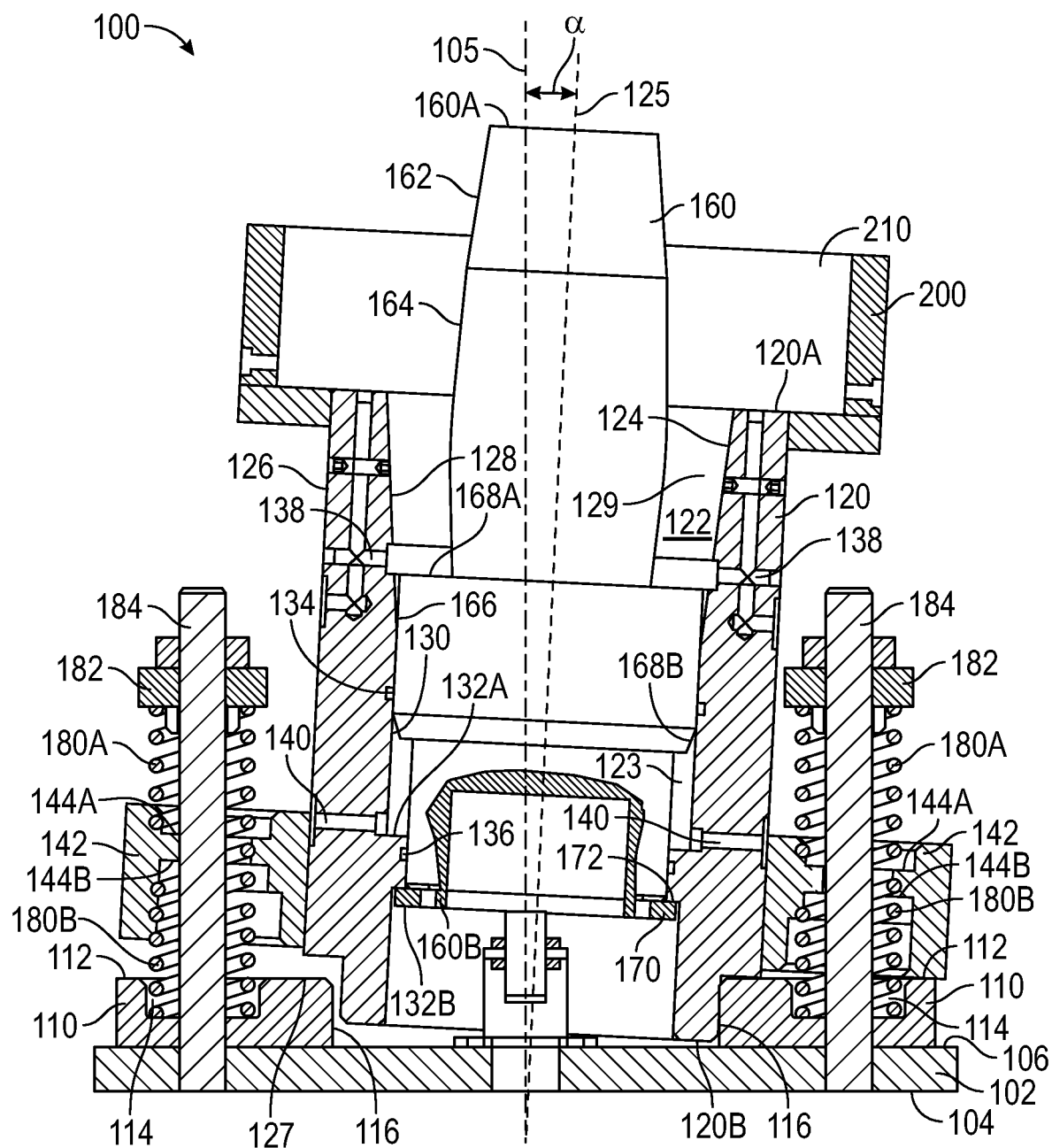

In the drawings and description that follow, like parts are typically marked throughout the specification and drawings with the same reference numerals. The drawing figures are not necessarily to scale. Certain features of the disclosed embodiments may be shown exaggerated in scale or in somewhat schematic form and some details of conventional elements may not be shown in the interest of clarity and conciseness. The present disclosure is susceptible to embodiments of different forms. Specific embodiments are described in detail and are shown in the drawings, with the understanding that the present disclosure is to be considered an exemplification of the principles of the disclosure, and is not intended to limit the disclosure to that illustrated and described herein. It is to be fully recognized that the different teachings of the embodiments discussed below may be employed separately or in any suitable combination to produce desired results.

Unless otherwise specified, in the following discussion and in the claims, the terms "including" and "comprising" are used in an open-ended fashion, and thus should be interpreted to mean "including, but not limited to . . . ". Any use of any form of the terms "connect", "engage", "couple", "attach", or any other term describing an interaction between elements is not meant to limit the interaction to direct interaction between the elements and may also include indirect interaction between the elements described. The various characteristics mentioned above, as well as other features and characteristics described in more detail below, will be readily apparent to those skilled in the art upon reading the following detailed description of the embodiments, and by referring to the accompanying drawings.

Referring to FIG. 1, an embodiment of a well or drilling system 10 for drilling and/or producing a well is shown. In the embodiment of FIG. 1, drilling system 10 includes a derrick 12 supported by a drilling platform 14. Platform 14 has a drill deck or rig floor 16 supporting a rotary table 18 selectively rotated by a prime mover (not shown) such as an electric motor controlled by a motor controller. In this embodiment, derrick 12 includes a traveling block 20 controlled by a drawworks 22 for raising and lowering a drill string 24 suspended from traveling block 20. Drill string 24 of drilling system 10 extends downward through the rotary table 18, a blowout preventer (BOP) stack 26, and into a borehole 3 that extends into a subterranean earthen formation 5 along a central or longitudinal axis 15 from the surface 7. Drill string 24 is formed from a plurality of pipe joints 28 connected end-to-end. In this embodiment, a bottom-hole-assembly (BHA) 30 is attached to the lowermost joint 28 and a drill bit 32 is attached to the lower end of BHA 30. BHA 30 includes, as examples, a drill collar, a mud motor, as well as other sensors or tools. Drilling system 10 comprises a land-based drilling system in this embodiment; however, in other embodiments, drilling system 10 may comprise an offshore drilling system.

In this embodiment, drill bit 32 is rotated with rotary table 18 via drill string 24 and BHA 30. By rotating drill bit 32 with weight-on-bit (WOB) applied, the drill bit 32 disintegrates the subsurface formations to drill borehole 3, which may also be referred to as a wellbore. In some embodiments, a top-drive may be used to rotate the drill string 24 rather than rotation by the rotary table 18. In some applications, a downhole motor (mud motor) is disposed in the drilling string 24 to rotate the drill bit 32 in lieu of or in addition to rotating the drill string 24 from the surface 7. The mud motor rotates the drill bit 32 when a drilling fluid passes through the mud motor under pressure. A casing 34 is installed and extends downward generally from the surface 7 into at least a portion of borehole 3. In some embodiments, casing 34 is cemented within the borehole 3 to isolate various vertically-separated earthen zones, preventing fluid transfer between the zones. BOP stack 26 is secured to the upper end of casing 34. In this embodiment, casing 34 comprises multiple tubular members, such as pieces of threaded pipe, joined end-to-end to form liquid-tight or gas-tight connections, to prevent fluid and pressure exchange between the inner surface of casing 34 and a surrounding earthen zone.

An annular space or annulus 36 is formed between both the sidewall of borehole 3 and drill string 24 and between casing 34 and drill string 24. In other words, annulus 36 extends through borehole 3 and casing 34. BOP stack 26 includes an annular space or flow path 38 in fluid communication with annulus 36. An annular BOP of the BOP stack 26 is generally configured to selectively seal the annular flow path 38 from annulus 36, and hence selectively seal annulus 36, at the surface 7 to thereby inhibit fluid contained in annulus 36 from discharging upward. An operator and/or drilling control system of drilling system 10 may selectively and controllably open and close the annular BOP of BOP stack 26 to allow, to restrict, or to inhibit the flow of drilling fluid or another fluid through flow path 38 and annulus 36. In this embodiment, drilling system 10 includes a drilling fluid circulation system to circulate drilling fluid or mud 40 down drill string 24 and back up annulus 36. Drilling fluid 40 generally functions to cool drill bit 32, remove cuttings from the bottom of borehole 3, and maintain a desired pressure or pressure profile in borehole 3 during drilling operations. Drilling system further includes a drilling fluid reservoir or mud tank 42, a supply pump 44, a supply line 46 connected to the outlet of supply pump 44, and a kelly 48 for supplying drilling fluid 40 to the drill string 24.

In this embodiment, drilling system 10 includes a lubricator assembly 100 positioned on the rig floor 16 of platform 14 for lubricating the threads of individual pipe joints 28 prior to their coupling to an upper end of drill string 24. Particularly, in this embodiment, the upper end of the uppermost pipe joint 28 of drill string 24 comprises an internally threaded box end configured to receive an externally threaded pin end of the pipe joint 28 (or a stand of multiple pipe joints 28 threaded together) to be coupled to drill string 24. Lubricator assembly is generally configured to clean and lubricate the external threads of the pin end of the pipe joint 28 prior to its coupling with the box end of the uppermost pipe joint 28 of drill string 24. Thread locator 100 is mounted to rig floor 16 and is positioned in a setback or laterally spaced position from the central axis 15 of borehole 3. In at least some applications, the available space on rig floor 16 may be limited, and lubricator assembly 100 provides a convenient and space efficient means for cleaning and lubricating the external threads of the pin end of the pipe joint 28 to be coupled to the drill string 24, with the pipe joint 28 being disposed in a vertical or substantially vertical position. Additionally, as will be described further herein, lubricator assembly 100 conveniently relies on the weight of the pipe joint 28 (or pipe stand) to be coupled to drillstring 24 for actuating lubricator assembly 100, such that lubricator assembly 100 does not need to rely on externally provided power (and the additional cables running along rig floor 16) for performing this function.

Referring to FIGS. 2-9, an embodiment of the lubricator assembly 100 of FIG. 1 is shown in FIGS. 2-9. In the embodiment of FIGS. 2-9, lubricator assembly 100 generally includes a mounting base 102, a lubricant can or housing 120, a guide pin 160, a plurality of first or upper biasing members 180A, a plurality of second or lower biasing members 180B, and an annular cap 200 that houses a thread cleaner or brush 210. Mounting base 102 has a central or longitudinal axis 105 (shown in FIGS. 5-7) and generally includes a base plate 104 (hidden from view in FIG. 3) and a plurality of circumferentially spaced mounts 110 positioned on a planar surface 106 of base plate 104. In this embodiment, base plate 104 includes a plurality of apertures 108 for receiving fasteners (not shown in FIGS. 2-8) In this embodiment, each mount 110 includes an upper surface 112 and a centrally positioned receptacle 114 extending from upper surface 112 that receives an end of one of the biasing members 180. Additionally, each mount 110 includes a curved inner surface 116 positioned adjacent lubricant housing 120. As will be described herein, interference between upper surface 112 and curved inner surface 114 of each mount 110 and lubricant housing 120 may serve to delimit the degree of permitted angular misalignment between mounting base 102 and lubricant housing 120.

The lubricant housing 120 of lubricator assembly 100 is generally cylindrical with a central or longitudinal axis 125 (shown in FIGS. 5-7) and generally includes a first or upper end 120A, a second or lower end 120B opposite upper end 120A, a central bore or passage 122 defined by a generally cylindrical inner surface 124 extending between ends 120A, 120B, and a generally cylindrical outer surface 126 extending between ends 120A, 120B. The outer surface 126 of lubricant housing 120 includes an annular shoulder 127 that is positioned proximal lower end 120B. In this embodiment, the inner surface 124 of lubricant housing 120 includes an angled or frustoconical surface 128 extending from upper end 120A, a cylindrical or constant diameter surface 130 extending from a lower end of frustoconical surface 128, an annular first stop or upper shoulder 132A positioned at a lower end of the cylindrical surface 130, and an annular second stop or lower shoulder 132B spaced from upper shoulder 132A. Lubricant housing 120 includes a first or upper annular seal 134 positioned within a groove formed in cylindrical surface 130 and a second or lower annular seal 136 positioned between upper shoulder 132A and lower shoulder 132B.

Lubricant housing 120 is generally configured to direct lubricant or "pipe dope" towards the pin end of the pipe joint 28 to be stabbed into the box end of the uppermost pipe joint 28 of drill string 24. In this embodiment, lubricant housing 120 includes a plurality of circumferentially spaced upper lubricant ports 138 and a plurality of circumferentially spaced lower lubricant ports 140 axially spaced from upper lubricant ports 138. Additionally, lubricant housing 120 includes a plurality of circumferentially spaced spring retainers 142 coupled or affixed to outer surface 126. Each spring retainer 142 includes a central bore or passage extending therethrough defined by an inner surface that includes an annular first or upper shoulder 144A and an annular second or lower shoulder 144B. Each spring retainer 142 is angularly or circumferentially aligned with a corresponding mount 110 of mounting base 102.

In this configuration, each lower biasing member 180B of lubricator assembly 100 extends between the receptacle 114 of a mount 110 and the lower shoulder 144B of a spring retainer 142. Additionally, each upper biasing member 180A extends between the upper shoulder 144A of a spring retainer 142 and a retainer nut 182 coupled to an upper end of a rod 184. Particularly, lubricator assembly 100 includes a plurality of circumferentially spaced retaining nuts 182 and corresponding rods 184, where a pair of biasing members 180A, 180B extends about each rod 184. Rods 184 are affixed to the base plate 104 of mounting base 102. In this embodiment, limited relative axial movement is permitted between lubricant housing 120 and mounting base 102 of lubricator assembly 100, where biasing members 180A, 180B serve to resist relative axial movement therebetween. As shown particularly in FIG. 7, a limited degree of angular misalignment (indicated by angle α in FIG. 7) is permitted between the central axis 105 of mounting base 102 and the central axis 125 of lubricant housing 120.

In some embodiments, the degree of permitted angular misalignment a between the central axis 105 of mounting base 102 and the central axis 125 of lubricant housing 120 is approximately between 2°-5°; however, in other embodiments, the degree the degree of permitted angular misalignment a may vary. Angular misalignment a permits lubricant housing 120 to accept the pin end of a pipe joint 28 that is disposed at a slight angle from vertical. Thus, the pipe joint 28 to be inserted into lubricant housing 120 need not be positioned exactly vertical to be inserted therein. Also shown particularly in FIG. 7, interference or contact between shoulder 127 of lubricant housing 120 and the upper surfaces 112 of mounts 110, as well as contact between the outer surface 126 of lubricant housing 120 and the inner surfaces 116 of mounts 110 serve to constrain the maximum permissible degree of angular misalignment a between central axis 105 and central axis 125. Thus, the degree of permitted angular misalignment a may be adjusted by adjusting the geometry of shoulder 127 and outer surface 126 of lubricant housing 120 and/or the geometry of upper surfaces 112 and inner surfaces 116 of mounts 110.

Guide pin 160 of lubricator assembly 100 is generally configured to guide the pin end of the pipe joint 28 into the central passage 122 of lubricant housing 120. In this embodiment, guide pin 160 is slidably disposed in the central passage 122 of lubricant housing 120 and generally includes a first or upper end 160A, a second or lower end 160B opposite upper end 160A, and a generally cylindrical outer surface 162 extending between upper end 160A and lower end 160B. In this embodiment, the outer surface 162 of guide pin 160 includes an angled or frustoconical surface 164 extending from upper end 160A, and a radially expanded surface 166 that defines an annular first or upper shoulder 168A and an annular second or lower shoulder 168B spaced from upper shoulder 168A. Additionally, in this embodiment, guide pin 160 includes an endplate 170 coupled to the lower end 160B of guide pin 160 that defines an annular shoulder or stop 172. Stop 172 has a greater outer diameter than the lower shoulder 132B of lubricant housing 120, and thus, stop 172 prevents guide pin 160 from being completely removed from the central passage 122 of lubricant housing 120.

In this embodiment, upper seal 134 of lubricant housing 120 sealingly engages the radially expanded surface 166 of guide pin 160 while the lower seal 136 of lubricant housing 120 sealingly engages the portion of outer surface 162 extending between lower shoulder 168B and lower end 160B. In this arrangement, an annular sealed chamber 123 is formed in the central passage 122 of lubricant housing 120, where sealed chamber 123 extends between seals 134, 136 and is in fluid communication with lower lubricant ports 140. Additionally, a lubricating chamber or zone 129 is formed in the central passage 122 of lubricant housing 120, where lubricating chamber 129 extends between upper shoulder 168A of guide pin 160 and the upper end 120A of lubricant housing 120. Cap 200 is coupled to the upper end 120A of lubricant housing 120 and receives brush 210, which extends radially inwards from cap 200. Brush 210 is configured to wipe or remove excess lubricant deposited on the pin end of the pipe joint 28 when the pipe joint 28 is removed from the central passage 122 of lubricant housing 120. In some embodiments, lubricator assembly 100 may include a mechanism (e.g., a gear or screw) coupled between guide pin 160 and brush 210 to rotate brush 210 in response to axial movement of guide pin 160 to assist with the cleaning of the pin end of the pipe joint 28.

Guide pin 160 is slidable relative to lubricant housing 120 and includes a first or upper position (shown in FIG. 7) where stop 172 is disposed directly adjacent or contacts the lower shoulder 132B of lubricant housing 120 and lower shoulder 168B of guide pin 160 is axially spaced from upper shoulder 132A, and a second or lower position (shown in FIG. 6) where stop 172 is axially spaced from lower shoulder 132B of lubricant housing 120 and lower shoulder 168B is disposed directly adjacent or contacts upper shoulder 132A. When guide pin 160 is in the upper position, sealed chamber 123 comprises a volume sized to receive an amount of lubricant sufficient for, but not in excess of, lubricating the pin end of a single pipe joint 28. Thus, sealed chamber 123 is sized to efficiently use the available lubricant supplied by drilling system 10 to lubricate the pin ends of pipe joints 28.

Figure 8:
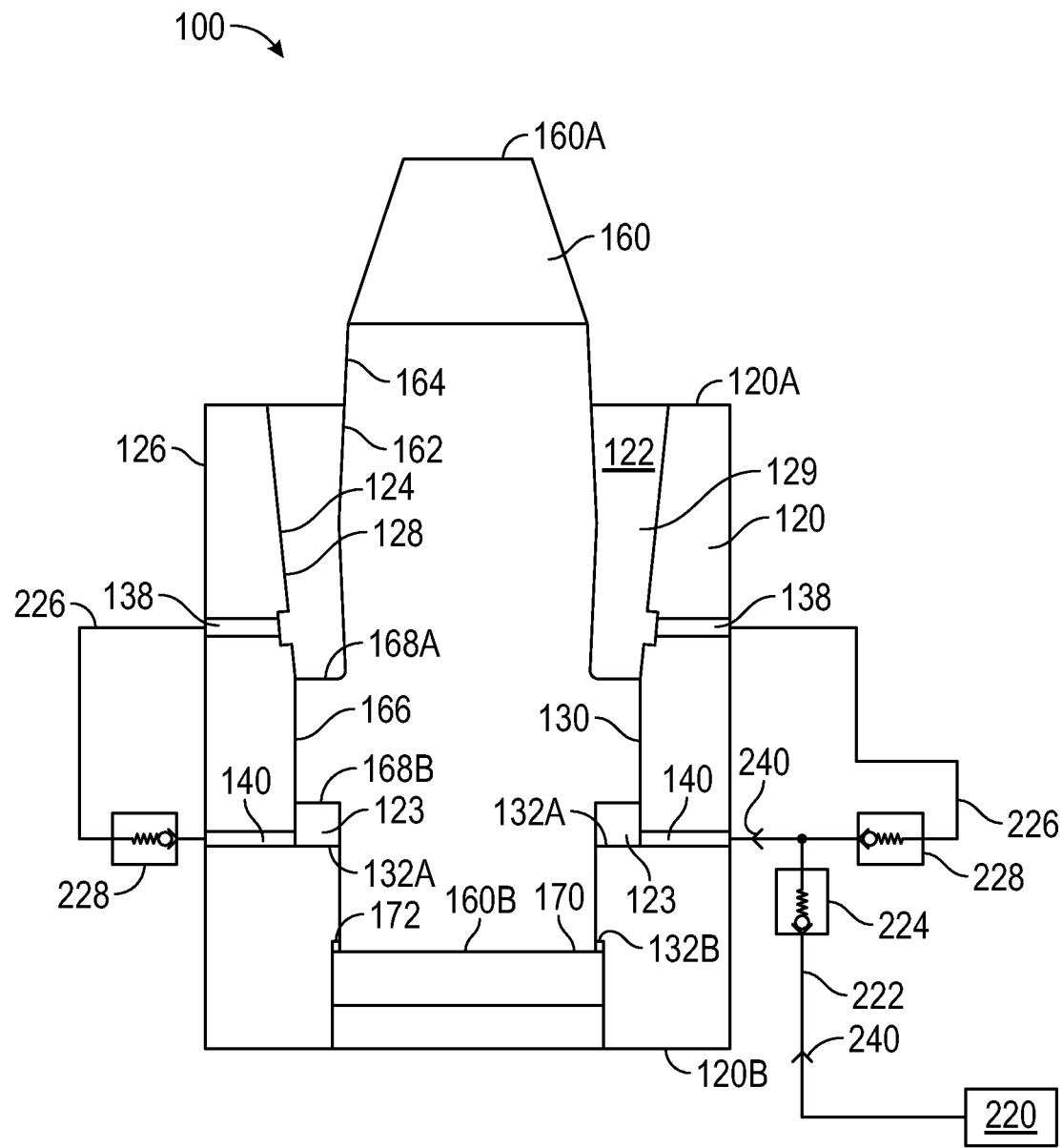
FIGS. 8, 9 are schematic views of the lubricator assembly of FIGS. 2, 3.
Figure 9:
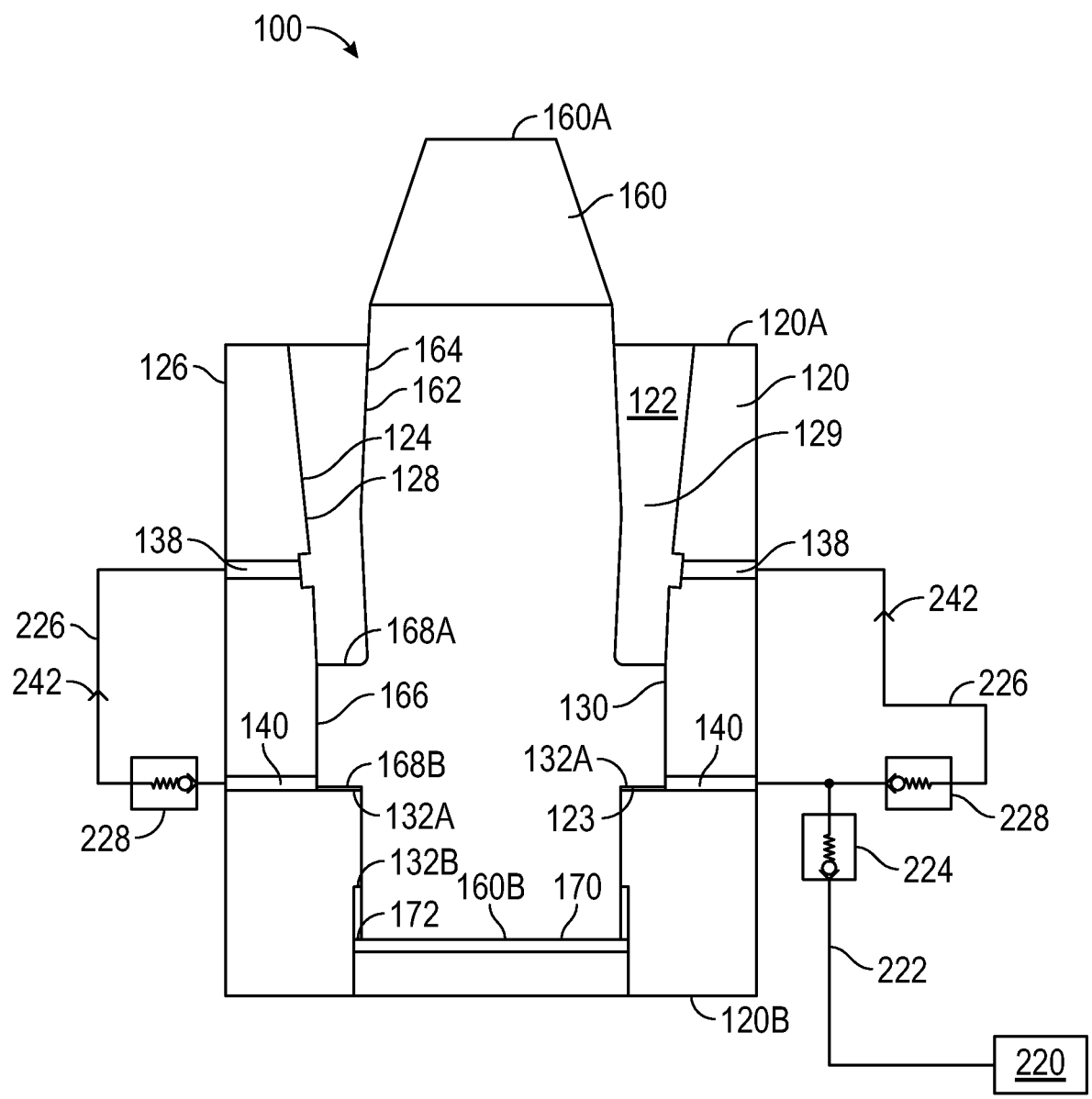

Drilling system 10 includes a lubricant or pipe dope supply 220 that is in fluid communication with sealed chamber 123 via a first conduit 222. Prior to inserting the pin end of a pipe joint 28 into lubricant housing 120, lubricant is pumped into sealed chamber 123 from lubricant supply 220 (indicated by arrows 240 in FIG. 8) via one or more of the lower lubricant ports 140, thereby forcing guide pin 160 into the upper position, as shown in FIG. 8. Interference between stop 172 of endplate 170 and lower shoulder 132B of lubricant housing 120 restricts further upward travel of guide pin 160 through lubricant housing 120 such that a desired amount of lubricant if received in sealed chamber 123. First conduit 222 includes a first check valve 225 for preventing lubricant received in sealed chamber 123 from returning to lubricant supply 120.

Once guide pin 160 is disposed in the upper position with sealed chamber 123 filled with the desired amount of lubricant, the pin end of a pipe joint 28 to be coupled to drill string 24 may be inserted into the central passage 122 of lubricant housing 120. As the pin end of pipe joint 28 is inserted into lubricant housing 120, the pin end is guided into lubricant housing 120 by the frustoconical outer surface 164 of guide pin 160 and the terminal end of the pin end engages the upper shoulder 168A of guide pin 160, thereby forcing guide pin 160 axially downwards through the central passage 122 of lubricant housing 120 until the lower shoulder 168B of guide pin 160 engages the upper shoulder 132A of lubricant housing 120. As the pipe joint 28 drives guide pin 160 into the lower position, the lower end 120B of lubricant housing 120 may bottom out and contact the planar surface 106 of base plate 104. Biasing members 180A, 180B serve to cushion or resist the downward motion of lubricant housing 120 relative to base plate 104 to prevent damage to the lubricator assembly 100 following contact between lubricant housing 120 and base plate 104. As guide pin 160 is forced downwards through lubricant housing 120 from the upper position to the lower position, lubricant is extruded from sealed chamber 123 into lubricating chamber 129 (indicated by arrows 242 in FIG. 9) via one or more second conduits 226 that extends between at least one of the lower lubricant ports 140 and at least one of the upper lubricant ports 138. In this embodiment, each second conduit 226 includes a second check valve 228 for preventing fluid from returning to sealed chamber 225 from lubricating chamber 129. In at least some embodiments, jets or similar devices are positioned in upper lubricant ports 138 to provide a desired spray pattern of lubricant against the pin end of the pipe joint 28 inserted into lubricant housing 120.

In the manner described above, guide pin 160 acts as a plunger actuated by the weight of the pipe joint 28 to pump lubricant from sealed chamber 123 into lubricating chamber 129 to lubricate the external threads of the pin end of the pipe joint 28. Given that lubricator assembly 100 is actuated by the weight of pipe joint 28, lubricator assembly 100 need not rely on a pump or other external means for injecting lubricant into lubricating chamber 129. Additionally, by relying on pipe joint 28 for actuating lubricator assembly 100, the speed by which lubricant is injected into lubricating chamber 129 may be maximized, thereby decreasing the amount of time required for lubricating the pin end of each pipe joint 28. In this embodiment, the frustoconical surface 128 of lubricant housing 120 is sized to minimize the radial gap formed between frustoconical surface 128 and the outer surface of the pin end of the pipe joint 28, assisting with the application of lubricant to the external threads of the pin end. Additionally, in at least some embodiments, guide pin 160 may include a mechanism (e.g., a gear, screw, etc.) configured to rotate guide pin 160 in response to being displaced axially relative to lubricant housing 120 by the pipe joint 28. The rotation of guide pin 160 may rotate the pipe joint 28 in concert therewith, assisting in the application of lubricant against the pin end of the pipe joint 28.

Following the injection of lubricant into lubricating chamber 129, the pin end of the pipe joint 28 may be lifted from the central passage 122 of lubricant housing 120, permitting brush 210 to wipe or clean excess lubricant from the pin end. As the pipe joint 28 is lifted from thread cleaner 100, friction between the pipe joint 28 and guide pin 160 may cause guide pin 160 to return to the upper position. In certain embodiments, a biasing member may apply a biasing force to guide pin 160 to return guide pin 160 to the upper position. In some embodiments, the displacement of guide pin 160 into the upper position may form a partial vacuum in sealed chamber 123, which may be utilized to draw lubricant into sealed chamber 123 from lubricant supply 220 without the need of an external pump to force the lubricant into sealed chamber 123. In some embodiments, additional conduits may be provided between upper ports 138 and lower ports 140 to return excess lubricant in lubricating chamber 129 into sealed chamber 123 following the removal of the pipe joint 28 from lubricator assembly 100.

Figure 10:
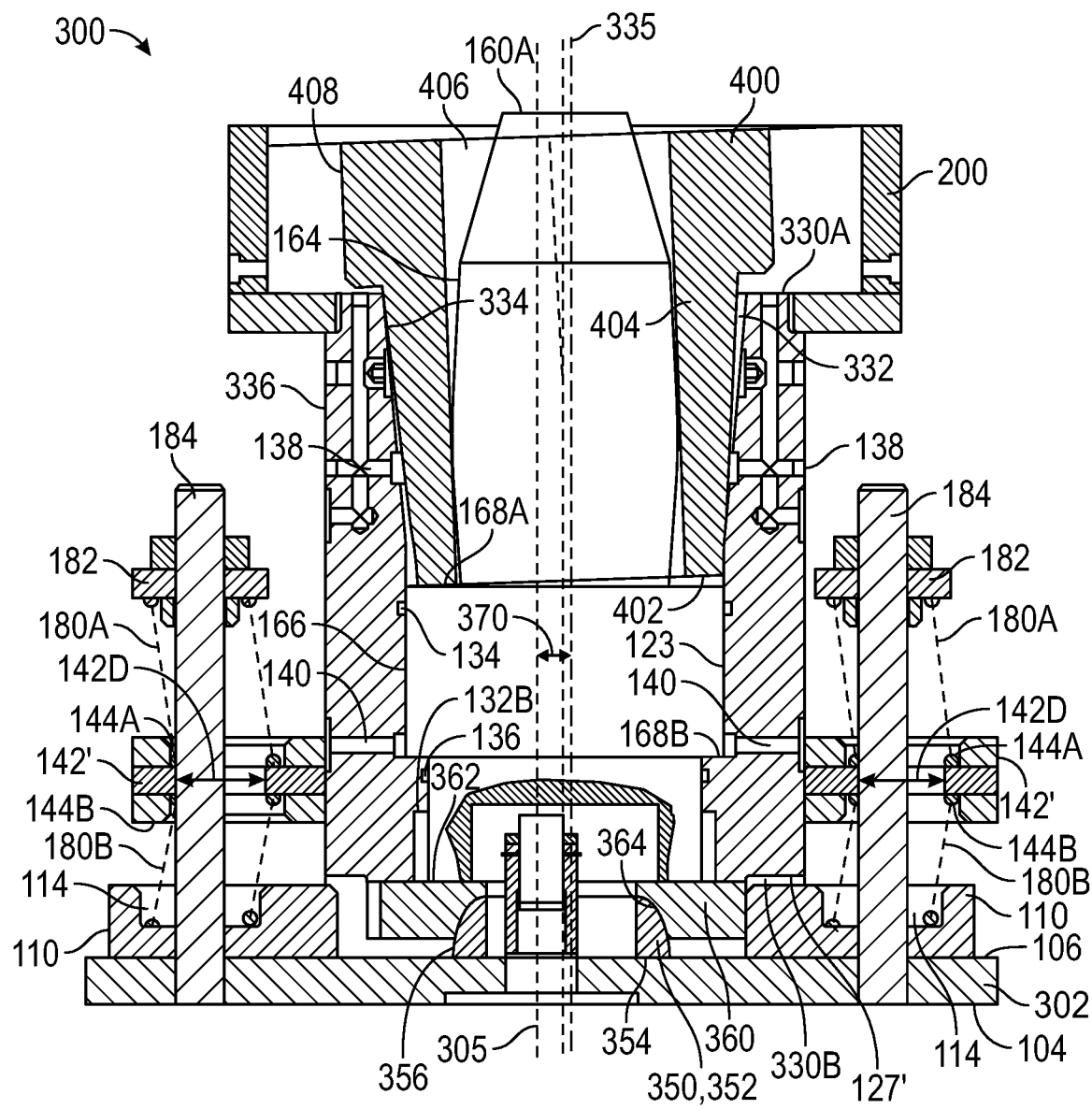
FIG. 10 is a side cross-sectional view of another embodiment of a lubricator assembly in accordance with principles disclosed herein.

Referring to FIG. 10, another embodiment of a lubricator assembly 300 for use with the drilling system 10 of FIG. 1 is shown in FIG. 10. Lubricator assembly 300 includes features in common with the lubricator assembly 100 shown in FIGS. 2-9, and shared features are labeled similarly. Lubricator assembly 300 includes a mounting base 302, a lubricant can or housing 330, and an annular spherical bearing 350. In the embodiment of FIG. 10, mounting base 302 of lubricator assembly 300 has a central or longitudinal axis 305 and is similar to the mounting base 102 of lubricator assembly 100 but includes a first or lower ring 352 of the spherical bearing 350. Lower ring 352 of spherical bearing 340 has a central or longitudinal axis that is coaxial with central axis 305 of mounting base 302 and generally includes a planar first or lower surface 354 that is slidably disposed on the planar surface 106 of base plate 104 and a second or upper surface 356 that comprises a convex hemispherical surface 356.

In this embodiment, the lubricant housing 330 of lubricator assembly 300 is generally cylindrical with a central or longitudinal axis 335 and generally includes a first or upper end 330A, a second or lower end 330B opposite upper end 330A, a central bore or passage 332 defined by a generally cylindrical inner surface 334 extending between ends 330A, 330B, and a generally cylindrical outer surface 336 extending between ends 330A, 330B. The lubricant housing 330 of lubricant assembly 300 is similar to lubricant housing 120 of the lubricator assembly 100 shown in FIGS. 2-9, except lubricant housing 330 includes a second or upper ring 360 of the spherical bearing 350. In this embodiment, the upper ring 360 of spherical bearing 350 includes a first or upper end defined by a planar upper surface 362 that is coupled or affixed to the lower end 330B of lubricant housing 330, and a second or lower end that includes a concave hemispherical surface 364 that matingly engages the hemispherical surface 356 of lower ring 352.

Lubricant assembly 300 is shown in FIG. 10 with a terminal end 402 of a tubular member or pipe joint 400 (shown partially in FIG. 10) inserted into the central passage 332 of lubricant housing 330. Particularly, in this embodiment, pipe joint 400 includes a pin end 404 positioned at the terminal end 402 of drill pipe 300, where pin end 404 is insertable into lubricant housing 330. Pipe joint 400 additionally includes a central bore or passage 406 and a generally cylindrical outer surface 408 extending from terminal end 402. The pin end 404 of pipe joint 400 is fully inserted into lubricant housing 330 in FIG. 10, with guide pin 160 of lubricant assembly 300 being disposed in the lower position and the upper end 160A of guide pin 160 being fully inserted into the central passage 406 of pipe joint 400.

In this embodiment, spherical bearing 350 permits mounting base 302 to physically support lubricant housing 330 (e.g., permits the transfer of loads from lubricant housing 330 to mounting base 302) when the pin end 404 of pipe joint 400 is fully inserted therein while also permitting lateral and angular misalignment between the central axis 305 of mounting base 302 and the central axis 335 of lubricant housing 330. Particularly, each spring retainer 142' of lubricant assembly 300 includes a central passage having an enlarged minimum inner diameter 142D that permits a relatively greater degree of lateral offset 370 between the central axis 305 of mounting base 302 and the central axis 335 of lubricant housing 330. Slidable engagement between the lower surface 354 and the planar surface 106 of mounting base 102 permits the lateral offset 370 between the central axis 305 of mounting base 302 and the central axis 335 of lubricant housing 330 while also permitting the transfer of loads from lubricant housing 330 and mounting base 302. In some embodiments, lubricant assembly is configured to provide approximately one to two inches of lateral offset 370; however, in other embodiments, the amount of lateral offset 370 provided by lubricant assembly 300 may vary. In this embodiment, contact between a radially outer surface of the upper ring 360 of spherical bearing 350 and a radially inner surface of one of the mounts 110 delimits or governs the maximum amount of lateral offset 370.

Additionally, mating engagement between the hemispherical surface 356 of lower ring 352 and the hemispherical surface 364 of upper ring 360 of spherical bearing 350 permits angular misalignment of the central axis 305 of mounting base 302 and the central axis 335 of lubricant housing 330 when the terminal end 402 of pipe joint 400 is fully inserted into lubricant housing 330 with guide pin 160 disposed in the lower position. Further, unlike lubricant assembly 100 shown in FIGS. 2-9, the annular shoulder 127' of lubricant housing 330 is axially spaced from the upper surfaces 112 of mounts 110 when the terminal end 402 of pipe joint 400 is fully inserted into lubricant housing 330 with guide pin 160 disposed in the lower position. Thus, in this embodiment, angular misalignment is permitted between the central axis 305 of mounting base 302 and the central axis 335 of lubricant housing 330 irrespective of the relative axial positions of lubricant housing 330 and mounting base 302.

Figure 11:
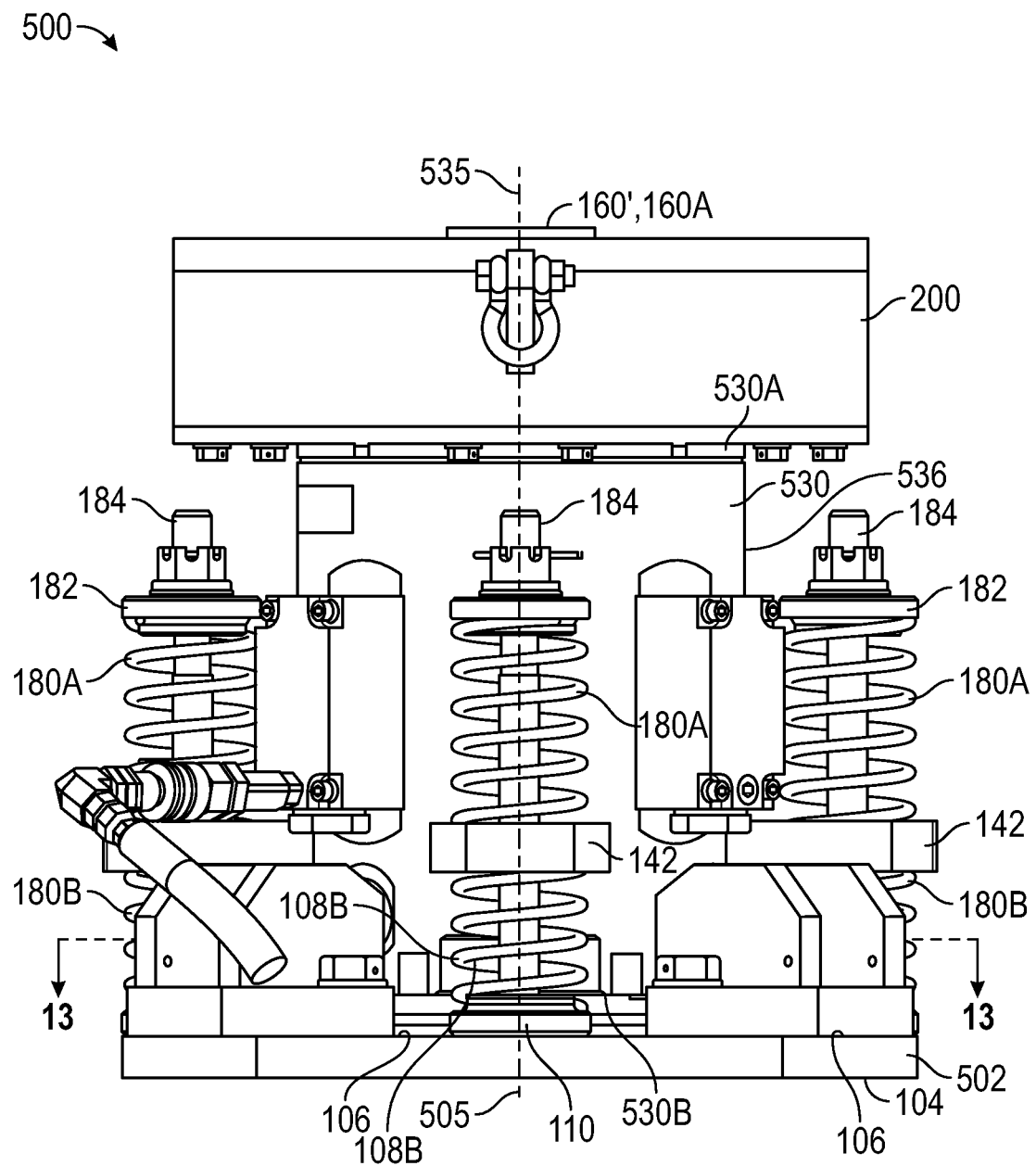
FIG. 11 is a side view of another embodiment of a lubricator assembly in accordance with principles disclosed herein.
Figure 12:
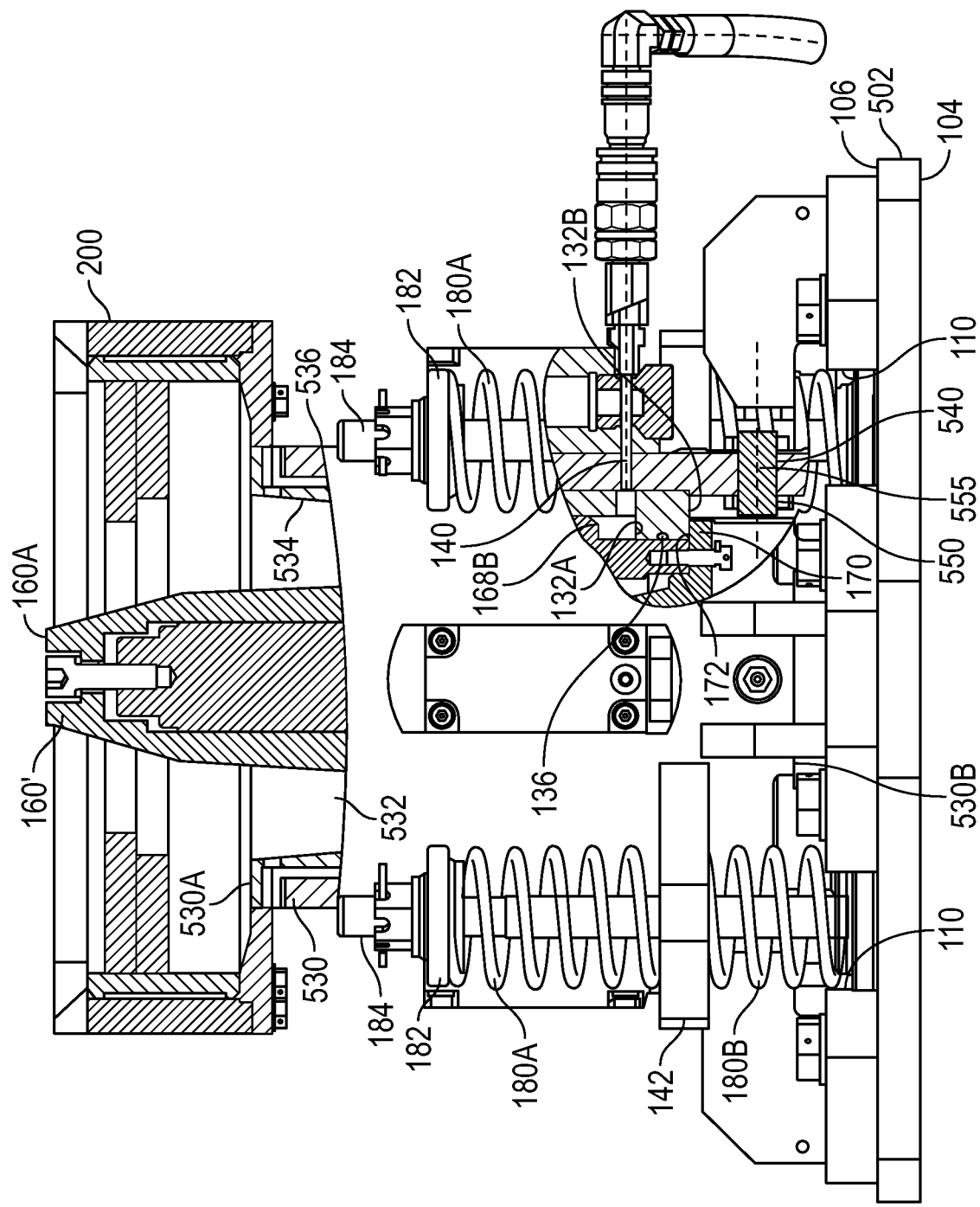
FIG. 12 is a side, partial cross-sectional view of the lubricator assembly of FIG. 11.
Figure 13:
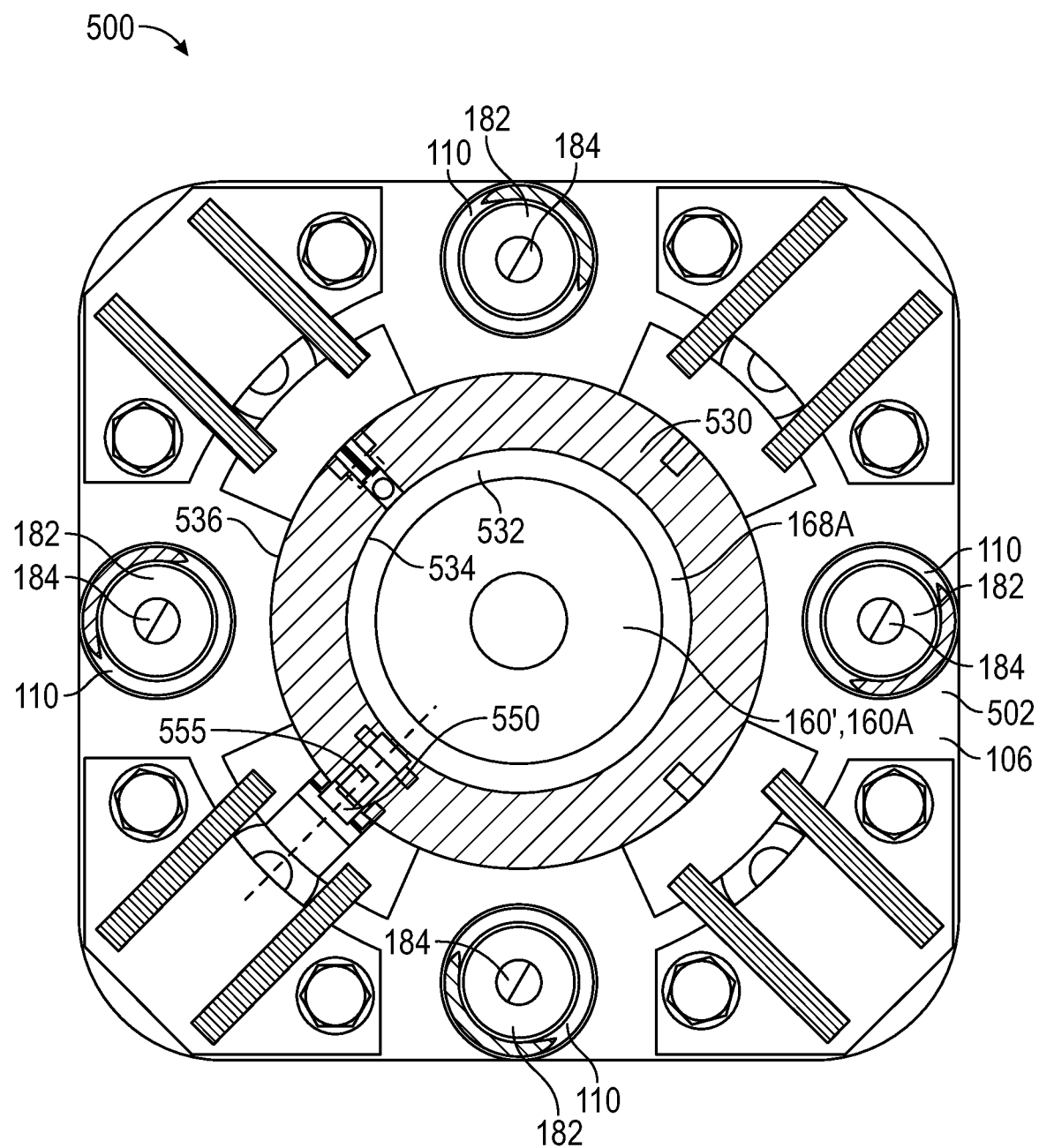
FIG. 13 is a cross-sectional view along line 13-13 of FIG. 11 of the lubricator assembly of FIG. 11.

Referring to FIGS. 11-13, another embodiment of a lubricator assembly 500 for use with the drilling system 10 of FIG. 1 is shown in FIGS. 11-13. Lubricator assembly 500 includes features in common with the lubricator assembly 100 shown in FIGS. 2-9, and lubricator assembly 300 shown in FIG. 10, and shared features are labeled similarly. Lubricator assembly 500 includes a mounting base 502, a lubricant can or housing 530, and an annular spherical bearing 550. In the embodiment of FIG. 11-13, mounting base 502 of lubricator assembly 500 has a central or longitudinal axis 505 (shown in FIG. 11) and is similar to the mounting base 302 of lubricator assembly 300.

In some embodiments, lubricator assembly 500 may include a spherical bearing (e.g., spherical bearing 340 shown in FIG. 10) including a lower ring (e.g., lower ring 352 shown in FIG. 10) positioned on planar surface 106 of mounting plate 502. In this embodiment, the lubricant housing 530 of lubricator assembly 500 is generally cylindrical with a central or longitudinal axis 535 and generally includes a first or upper end 530A, a second or lower end 530B opposite upper end 530A, a central bore or passage 532 defined by a generally cylindrical inner surface 534 extending between ends 530A, 530B, and a generally cylindrical outer surface 536 extending between ends 530A, 530B. The lubricant housing 530 of lubricator assembly 500 is similar to lubricant housing 120 of the lubricant assembly 100 shown in FIGS. 2-9, except lubricant housing 530 includes a sensor port 540 that extends between inner surface 534 and outer surface 536, where sensor port 540 is positioned proximal the lower end 530B of lubricant housing 530. Particularly, sensor port 540 is positioned along central axis 535 between lower shoulder 132B and lower end 530B of lubricant housing 530.

In this embodiment, a position sensor 550 is received or positioned in the sensor port 540 of lubricant housing 530. Position sensor 550 has a first or radially inner end, a second or radially outer end opposite the radially inner end, and a central or longitudinal axis 555 extending therebetween, where the central axis 555 of position sensor 550 is disposed orthogonal the central axis 535 of lubricant housing 530. In some embodiments, the central axis 555 of position sensor 550 intersects the central axis 535 of lubricant housing 530; however, in other embodiments, central axis 555 of position sensor 550 may not intersect central axis 535 of lubricant housing 530.

Position sensor 550 is generally configured to detect when a guide pin 160' (similar in configuration to guide pin 160 shown in FIGS. 2-9) of lubricant housing 530 is displaced into the lower position in response to the insertion of a pipe joint (e.g., pipe joint 400 shown in FIG. 10) is inserted into lubricant housing 530. Particularly, when guide pin 160' is in the upper position as shown particularly in FIG. 12, endplate 170 is axially spaced (relative central axis 535) from position sensor 550 with stop 172 of endplate 170 contacting or disposed directly adjacent lower shoulder 132B of lubricant housing 530.

As the pipe joint is inserted into lubricant housing 530, the pipe joint contacts upper shoulder 168A (not shown in FIGS. 11-13 of guide pin 160', thereby forcing or driving guide pin 160' from the upper position into the lower position with lower shoulder 168B of guide pin 160' contacting or disposed directly adjacent the upper shoulder 132A of lubricant housing 530. When guide pin 160' enters the lower position (not shown in FIGS. 11-13), endplate 170 substantially axially aligns or overlaps with position sensor 550 such that an outer surface of endplate 170 is disposed proximal or directly adjacent the radially inner end of position sensor 550. Particularly, with guide pin 160' in the lower position, the central axis 555 of position sensor 550 intersects an outer surface of the endplate 170 of guide pin 160'.

In some embodiments, position sensor 550 comprises a proximity sensor, such as a Hall effect sensor configured to detect changes in a magnitude of a magnetic field. For example, position sensor 550 comprising a Hall effect sensor may detect the presence of guide pin 160' by detecting a change in a magnitude of a magnetic field resulting from the change in position of guide pin 160' from the upper position, distal the radially inner end of position sensor 550, to the lower position, directly adjacent the radially inner end of position sensor 550. However, in other embodiments, position sensor 550 may comprise other types of sensors configured for measuring the position or proximity of a member (e.g., of guide pin 160'). For instance, in some embodiments, position sensor 550 may comprise an infrared sensor, a photoelectric sensor, an inductive proximity sensor, etc.

In some embodiments, position sensor 550 is in signal communication (e.g., electrically connected) to a monitoring system 75 (shown in FIG. 1) of drilling system 10. Particularly, monitoring system 75 is also in signal communication with input/output (I/O) unit 77 (e.g., a graphical user interface, a touchscreen interface, or the like) for displaying information and for receiving user inputs. The I/O unit 77 may display information related to the operation of drilling system 10 and may receive user inputs related to operation of drilling system 10. Particularly, position sensor 550 may transmit a signal to monitoring system 75 indicative of guide pin 160' being disposed in the lower position, and a positive indication of the guide pin 160' being disposed in the lower position may be relayed to a user or operator of drilling system 10 via a visual or audible alert or notification provided by the I/O unit 77 in signal communication with monitoring system 75.

In this manner, the operator of drilling system 10 may confirm that a pin end of a pipe joint (e.g., pipe joint 400 shown in FIG. 10) has been fully inserted into lubricant housing 530 and thus a pin end of the pipe joint has been fully lubricated by lubricator assembly 500 prior to removing the pipe joint from lubricant housing 530 and coupling the pipe joint with a tubular string (e.g., drill string 24) of drilling system 10. Thus, utilizing position sensor 550, monitoring system 75, and I/O unit 77, pipe joints serviced by lubricator assembly 500 may only be coupled to a tubular string of drilling system 10 if position sensor 550 of lubricator assembly 500 registers that the pin end of the pipe joint has been fully inserted into lubricant housing 530 of lubricator assembly 500, avoiding the possibility of inadvertently coupling a pipe joint to the tubular string that has not been fully inserted into lubricant housing 530 (e.g., due to a mechanical or other issue of lubricator assembly 500) and lubricated by lubricator assembly 500.

In certain embodiments, position sensor 550 of lubricator assembly 500 is in signal communication with a control system 79 (shown in FIG. 1) of drilling system 10 for controlling the operation of certain equipment of drilling system 10. For example, in certain embodiments, the coupling of a pipe joint (e.g., pipe joint 400 shown in FIG. 10) following the lubrication of a pin end of the pipe joint by lubricator assembly 500 to a tubular string (e.g., drill string 24 shown in FIG. 1) may be at least partially automated and controlled by the control system 79. Thus, control system 79 may be configured or programmed to proceed with retrieving the pipe joint from lubricator assembly 500 and coupling the pipe joint with the tubular string of drilling system 10 in response to receiving a signal from position sensor 550 indicative of the guide pin 160' being disposed in the lower position. Thus, control system 79 may only proceed with coupling the lubricated pipe joint with the tubular string if it is determined by position sensor 550 that the pin end of the pipe joint has been fully inserted into lubricant housing 530 and thus fully lubricated by lubricator assembly 500.

The above discussion is meant to be illustrative of the principles and various embodiments of the present disclosure. While certain embodiments have been shown and described, modifications thereof can be made by one skilled in the art without departing from the spirit and teachings of the disclosure. The embodiments described herein are exemplary only, and are not limiting. Accordingly, the scope of protection is not limited by the description set out above, but is only limited by the claims which follow, that scope including all equivalents of the subject matter of the claims.

What is claimed is:

1. A lubricator assembly for servicing a tubular member, comprising:
a mounting base;
a lubricant housing movably coupled to the mounting base and configured to receive lubricant from a lubricant source;
a guide pin slidably disposed in the lubricant housing;
a first seal positioned between the guide pin and the lubricant housing and a second seal positioned between the guide pin and the lubricant housing; and
a first chamber extending between the first seal and the second seal;
wherein the guide pin is configured to direct lubricant disposed in the first chamber against the tubular member in response to the tubular member engaging the guide pin.

2. The lubricator assembly of claim 1, further comprising a second chamber extending between the first seal and an end of the lubricant housing, wherein the second chamber is configured to receive an end of the tubular member.

3. The lubricator assembly of claim 2, further comprising:
a first port formed in the lubricant housing that is in fluid communication with the first chamber; and
a second port formed in the lubricant housing that is in fluid communication with the second chamber.

4. The lubricator assembly of claim 3, further comprising:
a first fluid conduit in fluid communication with the first port and the lubricant source; and
a second fluid conduit in fluid communication with the first port and the second port.

5. The lubricator assembly of claim 1, wherein the first seal and the second seal each sealingly engage an outer surface of the guide pin.

6. The lubricator assembly of claim 1, wherein an inner surface of the lubricant housing comprises a first stop configured to limit movement of the guide pin through the lubricant housing in a first axial direction and a second stop configured to limit movement of the guide pin through the lubricant housing in a second axial direction opposite the first axial direction.

7. The lubricator assembly of claim 1, further comprising a brush coupled to an end of the lubricant housing that is configured to clean an end of the tubular member.

8. The lubricator assembly of claim 1, further comprising a biasing member coupled between the mounting base and the lubricant housing, wherein the biasing member permits angular misalignment between a central axis of the mounting base and a central axis of the lubricant housing.

9. The lubricator assembly of claim 1, further comprising a spherical bearing positioned between the lubricant housing and the mounting base.

10. The lubricator assembly of claim 9, wherein the spherical bearing comprises:
a first ring coupled to an end of the lubricant housing, wherein the first ring comprises a first hemispherical surface; and
a second ring slidably disposed on the mounting base, wherein the second ring comprises a second hemispherical surface that matingly engages the first hemispherical surface.

11. The lubricator assembly of claim 1, further comprising:
a position sensor coupled to the lubricant housing;
wherein the guide pin comprises a first position in the lubricant housing and a second position in the housing that is spaced from the first position, and wherein the guide pin is configured to actuate from the first position to the second position in response to the tubular member engaging the guide pin;
wherein the position sensor is configured to detect the presence of the guide pin in the second position.

12. A lubricator assembly for servicing a tubular member, comprising:
a mounting base mountable to a rig floor of a platform;
a lubricant housing movably coupled to the mounting base and configured to receive lubricant from a lubricant source;
a guide pin slidably disposed in the lubricant housing, wherein the guide pin is configured to direct lubricant against the tubular member in response to the tubular member engaging the guide pin;
a first biasing member coupled between the mounting base and the lubricant housing, wherein the biasing member permits angular misalignment between a central axis of the mounting base and a central axis of the lubricant housing.

13. The lubricator assembly of claim 12, wherein:
the mounting base comprises a base plate and a plurality of circumferentially spaced mounts; and
the lubricator assembly comprises a plurality of the first biasing members, and wherein each first biasing member is received in one of the mounts of the mounting base.

14. The lubricator assembly of claim 13, further comprising:
a plurality of circumferentially spaced spring retainers coupled to the lubricant housing, wherein each of the first biasing members extends into one of the spring retainers; and
a plurality of second biasing members, wherein each second biasing member extends between one of the spring retainers and a retainer nut coupled to the mounting base.

15. The lubricator assembly of claim 13, wherein:
each mount comprises a curved inner surface;
an outer surface of the lubricant housing comprises an annular shoulder; and
the degree of permitted angular misalignment between the central axis of the mounting base and the central axis of the lubricant housing is limited by interference between the shoulder of the lubricant housing and the curved inner surfaces of the mounts.

16. The lubricator assembly of claim 12, further comprising:
a first seal positioned between the guide pin and the lubricant housing and a second seal positioned between the guide pin and the lubricant housing; and
a first chamber extending between the first seal and the second seal;
wherein the guide pin is configured to direct lubricant disposed in the first chamber against the tubular member in response to the tubular member engaging the guide pin.

17. The lubricator assembly of claim 16, further comprising a second chamber extending between the first seal and an end of the lubricant housing, wherein the second chamber is configured to receive an end of the tubular member.

18. The lubricator assembly of claim 17, further comprising:
a first port formed in the lubricant housing that is in fluid communication with the first chamber; and
a second port formed in the lubricant housing that is in fluid communication with the second chamber.

19. The lubricator assembly of claim 18, further comprising:
a first fluid conduit in fluid communication with the first port and the lubricant source; and
a second fluid conduit in fluid communication with the first port and the second port.

20. The lubricator assembly of claim 12, further comprising a spherical bearing positioned between the lubricant housing and the mounting base.

21. The lubricator assembly of claim 20, wherein the spherical bearing comprises:
a first ring coupled to an end of the lubricant housing, wherein the first ring comprises a first hemispherical surface; and
a second ring slidably disposed on the mounting base, wherein the second ring comprises a second hemispherical surface that matingly engages the first hemispherical surface.

22. The lubricator assembly of claim 1, further comprising:
a position sensor coupled to the lubricant housing;
wherein the guide pin comprises a first position in the lubricant housing and a second position in the housing that is spaced from the first position, and wherein the guide pin is configured to actuate from the first position to the second position in response to the tubular member engaging the guide pin;
wherein the position sensor is configured to detect the presence of the guide pin in the second position.

23. A method for lubricating an end of a tubular member, comprising:
(a) inserting an end of the tubular member into a lubricant housing of a lubricator assembly;
(b) displacing a guide pin of the lubricator assembly through the lubricant housing in response to (a); and
(c) directing lubricant against the end of the tubular member in response to (b).

24. The method of claim 23, further comprising:
(d) ejecting lubricant disposed in a first chamber formed between the guide pin and the lubricant housing of the lubricator assembly in response to inserting the end of the tubular member into the lubricant housing.

25. The method of claim 24, further comprising:
(e) injecting lubricant into a second chamber formed between the guide pin and the lubricant housing in response to (d).

26. The method of claim 23, further comprising:
(d) angularly misaligning a central axis of a mounting base of the lubricator assembly with a central axis of the lubricant assembly in response to (a).

27. The method of claim 23, wherein:
(b) comprises:
(b1) actuating the guide pin from a first position in the lubricant housing to a second position in the lubricant housing which is spaced from the first position; and
the method further comprises:
(d) detecting the presence of the guide pin in the second position using a position sensor.

* * * * *